United States Patent
Margulies

(10) Patent No.: US 7,437,284 B1
(45) Date of Patent: Oct. 14, 2008

(54) METHODS AND SYSTEMS FOR LANGUAGE BOUNDARY DETECTION

(75) Inventor: Benson I. Margulies, Lexington, MA (US)

(73) Assignee: Basis Technology Corporation, Cambridge, MA (US)

( * ) Notice: Subject to any disclaimer, the term of this patent is extended or adjusted under 35 U.S.C. 154(b) by 702 days.

(21) Appl. No.: 10/883,038

(22) Filed: Jul. 1, 2004

(51) Int. Cl.
*G06F 17/28* (2006.01)
*G06F 17/27* (2006.01)
*G10L 11/00* (2006.01)

(52) U.S. Cl. ............................... 704/7; 704/9; 704/227; 715/264

(58) Field of Classification Search .................. 704/8
See application file for complete search history.

(56) References Cited

U.S. PATENT DOCUMENTS

| | | | | |
|---|---|---|---|---|
| 5,440,615 | A * | 8/1995 | Caccuro et al. | 379/88.06 |
| 5,913,185 | A * | 6/1999 | Martino et al. | 704/8 |
| 5,991,441 | A * | 11/1999 | Jourjine | 382/187 |
| 6,272,456 | B1 * | 8/2001 | de Campos | 704/8 |
| 6,292,772 | B1 * | 9/2001 | Kantrowitz | 704/9 |
| 6,456,892 | B1 * | 9/2002 | Dara-Abrams et al. | 700/83 |
| 7,152,056 | B2 * | 12/2006 | Snyder | 707/2 |
| 2003/0200079 | A1 * | 10/2003 | Sakai | 704/8 |

* cited by examiner

*Primary Examiner*—David R Hudspeth
*Assistant Examiner*—Brian L Albertalli
(74) *Attorney, Agent, or Firm*—Jacobs & Kim LLP; David Jacobs

(57) ABSTRACT

Disclosed are methods and systems for detecting boundaries between areas of different languages in a body of text.

14 Claims, 6 Drawing Sheets

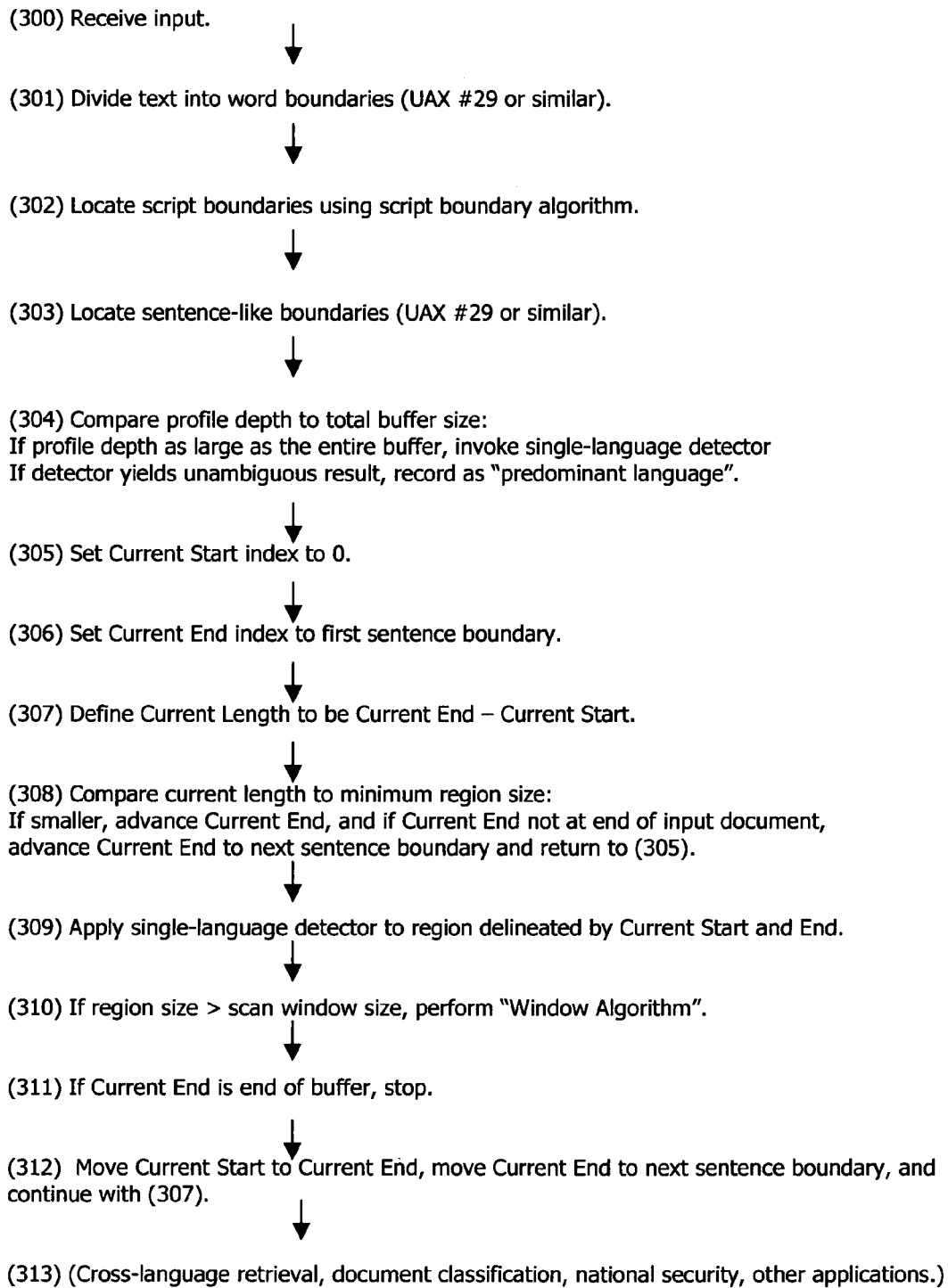

(300) Receive input.

(301) Divide text into word boundaries (UAX #29 or similar).

(302) Locate script boundaries using script boundary algorithm.

(303) Locate sentence-like boundaries (UAX #29 or similar).

(304) Compare profile depth to total buffer size:
If profile depth as large as the entire buffer, invoke single-language detector
If detector yields unambiguous result, record as "predominant language".

(305) Set Current Start index to 0.

(306) Set Current End index to first sentence boundary.

(307) Define Current Length to be Current End – Current Start.

(308) Compare current length to minimum region size:
If smaller, advance Current End, and if Current End not at end of input document, advance Current End to next sentence boundary and return to (305).

(309) Apply single-language detector to region delineated by Current Start and End.

(310) If region size > scan window size, perform "Window Algorithm".

(311) If Current End is end of buffer, stop.

(312) Move Current Start to Current End, move Current End to next sentence boundary, and continue with (307).

(313) (Cross-language retrieval, document classification, national security, other applications.)

FIG. 3

(401) Set Current Start Index to 0.

(402) Set Current End index to Current Start Index + Scan Window Size.

(403) Compare Current End Index to Script Boundaries:

(403a) If there is a script boundary near Current End Index, adjust Current End Index to Script Boundary.

(404) Compare Current End Index to Word Boundaries:

(404a) If Current End Index falls within a word, and the end of the word is no more than ½ (Scan Window Size) from Current End Index, move Current End Index out to the end of the word.

(405) Apply single-language detector to Current Region.

(405a) Transmit detected language of Current Region as "hint" to the detector.

(406) If single-language detector yields unambiguous result, record detected language result as window result.

(407) If Current End Index is End of Region, end; or

(408) If Current End Index is not End of Region, move Current Start Index to Current End Index and return to (402).

FIG. 4

(500a) Define "letter-like" character to be character that satisfies:
"upper-case letter", "lower-case letter", "title-case letter", "modifier letter" or "other letter".

(500b) Define "normalized script" of a character to be Unicode script property
(exception: Hiragana and Katakana mapped to CJK).

(501) Scan text characters in buffer, testing each to determine whether "letter-like",
stop at first letter-like character, or, if no characters letter-like, end with null result.

(502a) Record Normalized Script of first detected letter-like character as Current Script.

(502b) Record index of first detected letter-like character as Current Region Start Index.

(503) Scan forward, testing each character.

(504) If character under test not letter-like, continue scan.

(505) If character under test letter-like, check Normalized Script, and
if Normalized Script = Current Script, continue scan.

(506) If scan reaches End of Buffer, record 3-tuple of Current Start Index,
End-of-Buffer Index and Current Script as a Script Region, and end; or

(507) If character is letter-like but its Normalized Script does not match Current Script, then:
(a) Record 3-tuple of Current Start Index, Current Index and Current Script as a Script Region,
(b) Reset Current Start Index to Current Index, and
(c) Reset Current Script to script of character under test, and
(d) Continue scan.

FIG. 5

METHODS AND SYSTEMS FOR LANGUAGE BOUNDARY DETECTION

FIELD OF THE INVENTION

The present invention relates generally to methods, systems, devices and software products for natural language processing, and, in particular, relates to methods, systems, devices, structures and software products for detecting or identifying boundaries between different languages in a body of text or other input buffer that may contain portions written in different languages, such as English, Japanese, French, Arabic or other.

BACKGROUND OF THE INVENTION

As interest increases in reviewing, translating, transcribing, scanning, searching or otherwise analyzing or processing natural language texts, whether for business, scientific or academic endeavors, national security or other reasons, and whether in English, Japanese, French, Arabic or other languages, there exists a need for improved methods, systems, devices, structures and software products for enabling efficient and accurate processing of text.

Given the increasingly global nature of business and other enterprises, it is not unusual to receive bodies of text written in more than one language. Applications that process input data in today's global environment must be capable of processing data in languages from all over the world. Often, valuable information enters into an organization as unspecified text from disparate, unstructured sources such as e-mail, HTML pages, legacy systems, and external data feeds. Enabling an enterprise's critical information applications to handle this information is a significant challenge.

As the number of systems and applications for analyzing text increases, it would be useful to support and enhance such applications by enabling them to detect boundaries between different languages in a body of text. This could enable, for example, the dynamic optimization of processing between text sections of different languages.

The prior art contains methods for determining the language of a body of text, assuming that it is in a single language. Approaches to this problem typical of the prior art employ statistical and heuristic methods to determine the language of a body of text, again assuming that it is in a single language. (See, e.g., Cavner, W. and Trenkle, J., "N-Gram-Based Text Categorization".) Thus, even though it is increasingly common to receive multi-lingual bodies of text, conventional language detecting and processing methods and software are generally adapted for texts written in a single language.

The prior art also includes methods for determining logical boundaries between units of text, such as words or sentences. An example is set forth in the Unicode Standard Annex #29, "Text Boundaries" (available at: http://www.unicode.org/reports/tr29/tr29-4.html). The method disclosed in that Annex is referred to below as the method of "UAX #29", and is incorporated herein by reference as if set forth in its entirety.

However, the prior art does not describe an efficient, automated way to detect or identify boundaries between areas of different languages in a body of text containing multiple languages.

SUMMARY OF THE INVENTION

The present invention provides methods, software or hardware structures, and systems for detecting boundaries between areas of different languages in a body of text.

In particular, the invention includes methods for computerized analysis of a body of text that may include portions of text in each of several languages. The methods described herein invoke multiple analytical strategies to determine the boundaries between the different languages in the document or other body of text.

One aspect of the invention is a method comprising receiving a buffer containing text, and then:

(1) detecting word boundaries in the text by executing an algorithm for determining boundaries between logical units in text (such as UAX #29 or the like), (2) determining script boundaries in the text by executing a script boundary algorithm in accordance with the invention, an example of which is described in detail below, (3) determining the location of sentence-like boundaries by executing an algorithm for determining boundaries between logical units in text (UAX #29 or the like), (4) comparing a defined profile depth to the total size of the buffer, the profile depth being a maximum number of characters to be examined in detecting the language, (4a) if the profile depth is substantially the same size as the entire buffer, executing a (conventional or other) single-language detector on the buffer, (4b) if execution of the single-language detector yields an unambiguous result for a detected language, then recording the detected language as the predominant language of the text, (5) setting a "current start" index to zero, (6) setting a "current end" index to a first determined sentence boundary, (7) defining a "current length" to be "current end" index minus "current start" index, (8) comparing the current length to a defined minimum region size, the minimum region size being defined as a minimum amount of text to be analyzed at one time, (8a) if the current length is smaller than the minimum region size, then advancing the current end index, and if the current end index is not at the end of the buffer, advancing the current end index to the next sentence boundary and returning to the setting of a current start index, (9) applying the single-language detector to the region of text defined by the current start index and current end index,

(10) if the region size is greater than a defined scan window size, the scan window size being defined as an amount of text to examine when checking a region for sub-regions, then invoking a window operation (an example of which is described below) to check for sub-regions,

(11) if the current end index is at the end of the buffer, stopping execution, or,

(12) if the current end index is not at the end of the buffer, then moving the current start index to the current end index, moving the current end index to the next sentence boundary, and returning to the step of defining a current length.

Further aspects of the invention include a window algorithm and a script algorithm for use in the above-described overall method of the invention. Examples of these are described in detail below.

Yet another aspect of the invention comprises software and/or hardware structures, which may be implemented within a conventional PC, PDA, server or other computing device or network of devices, for executing the above-referenced method aspects.

The invention has numerous applications in text and document analysis, including cross-language information retrieval, document classification based on the language population of a document, and even national security, such as by detecting the presence of text in a particular language concealed in the midst of a different text or body of information.

These and other aspects, features and advantages of the invention will become more apparent from the following detailed description, in conjunction with the accompanying drawings, in which embodiments of the invention are shown and described by way of illustrative example.

BRIEF DESCRIPTION OF THE DRAWINGS

FIG. 3 is a flowchart illustrating an overall method in accordance with the present invention.

FIG. 4 is a flowchart illustrating the window algorithm aspect of the method of FIG. 3.

FIG. 5 is a flowchart illustrating the script boundary algorithm aspect of the method of FIG. 3.

DETAILED DESCRIPTION OF THE INVENTION

The following discussion describes methods, structures and systems in accordance with the present invention for detecting boundaries between various languages in a body of text or other input. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing means and computational means described below and recited in the claims may therefore be implemented in the software and/or hardware elements of a properly configured digital processing device or network of devices.

Figure 1:
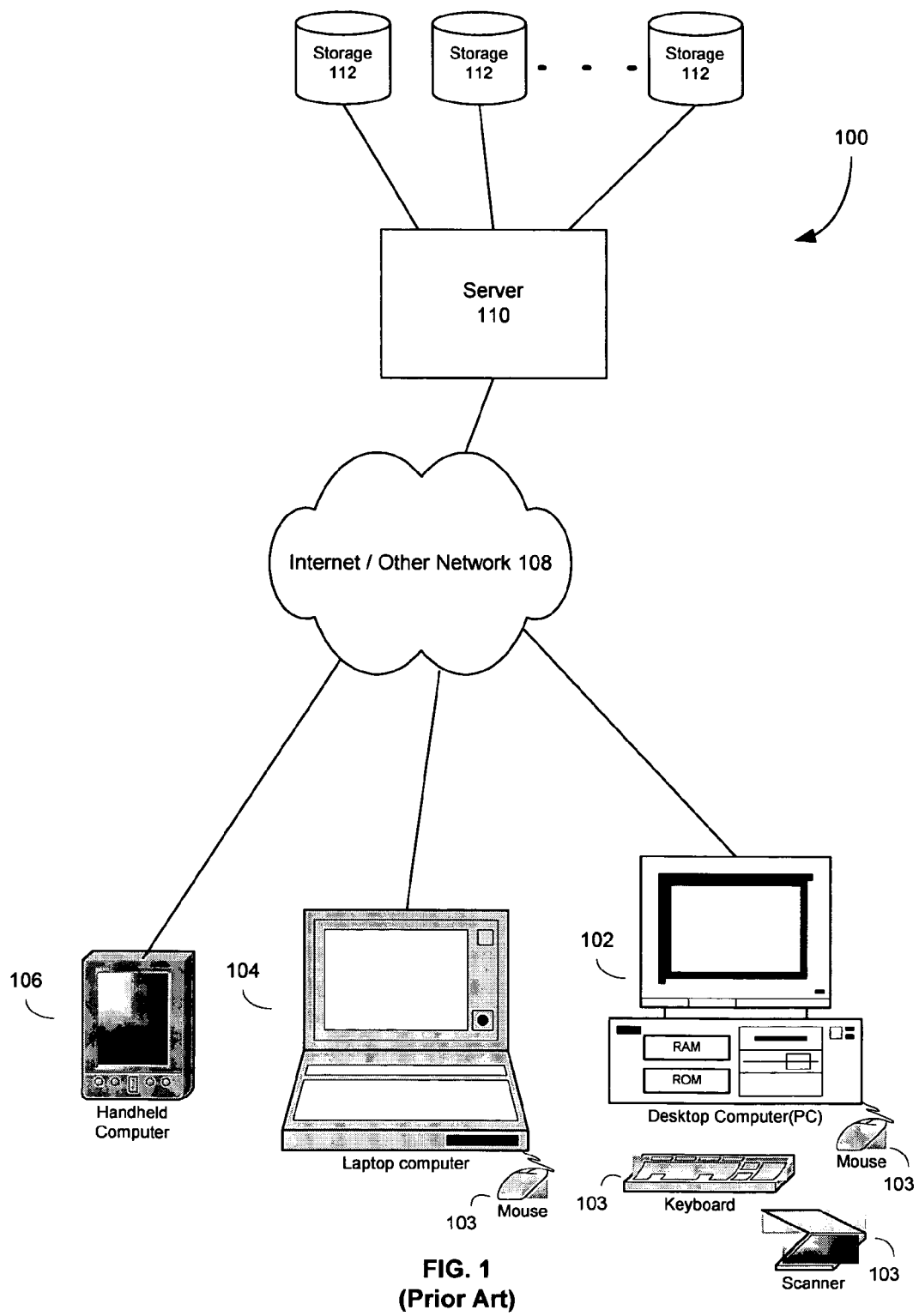
FIG. 1 is a schematic diagram of a conventional digital processing system in which the present invention can be deployed.

Methods, devices or software products in accordance with the invention can operate on any of a wide range of conventional computing devices and systems, like those depicted by way of example in FIG. 1 (e.g., network system 100), whether standalone, networked, portable or fixed, including conventional PCs 102, laptops 104, handheld or mobile computers 106, or across the Internet or other networks 108, which may in turn include servers 110 and storage 112.

Figure 2:
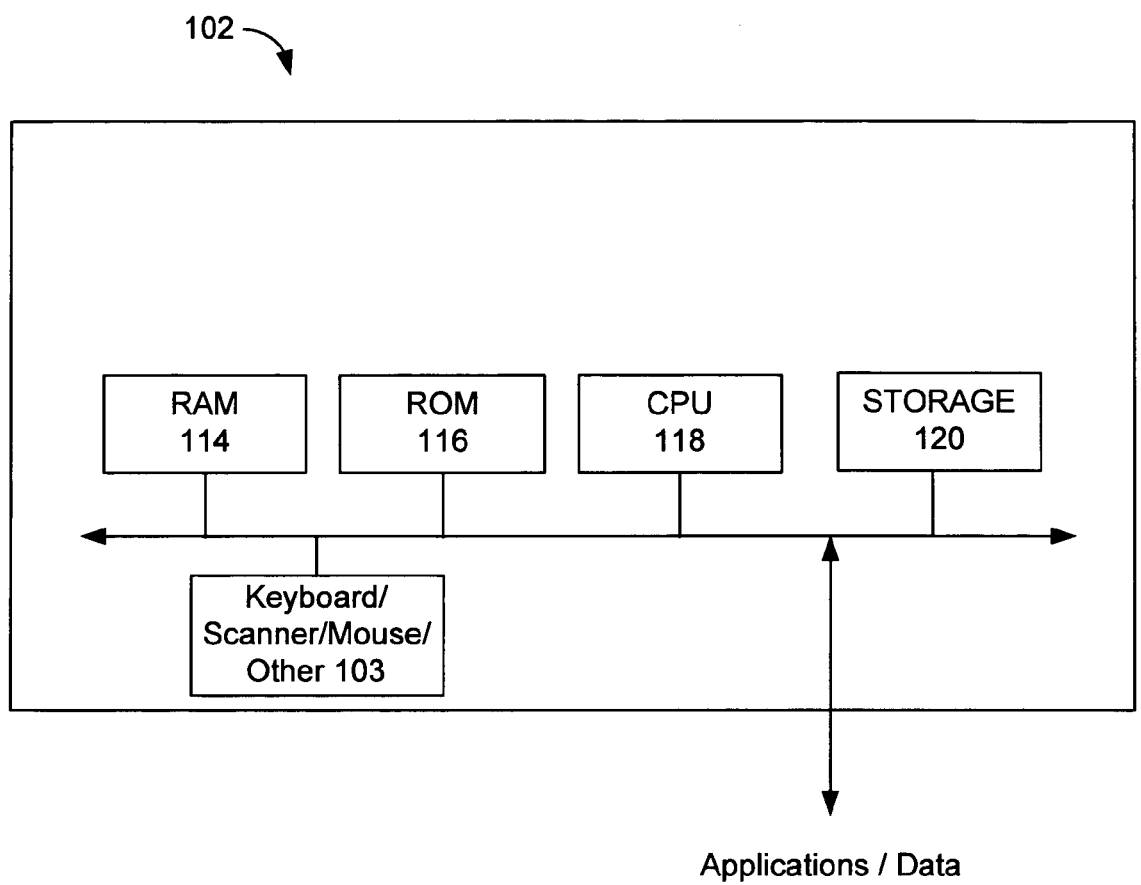
FIG. 2 is a schematic diagram of a conventional PC or other computing apparatus in which the present invention can be deployed.

In line with conventional computer software and hardware practice, a software application configured in accordance with the invention can operate within, e.g., a PC 102 like that shown in FIG. 2, in which program instructions can be read from CD ROM 116, magnetic disk or other storage 120 and loaded into RAM 114 for execution by CPU 118. Data can be input into the system via any known device or means, including a conventional keyboard, scanner, mouse or other elements 103.

Overall Method:

FIG. 3 is a flowchart depicting an overall method in accordance with the present invention. As shown therein, the invention includes a method of detecting boundaries between languages in a body of text. In a typical implementation, the method accepts as an input a buffer containing text. A particularly advantageous implementation may represent this text in Unicode.

As noted above, the method builds upon known techniques for statistical and heuristic detection of the language of a buffer of text (which, in prior art approaches, assumed a single language). The methods of the invention advantageously utilize a language detector with the following capabilities:

(1) The ability to detect the language of buffers of 30 or more characters.

(2) The ability to tune the detection by providing a hint that indicates prior knowledge of the likely language of the buffer.

(3) The ability to set a threshold for the quality of the detection.

In one practice of the invention, the operation of the method is controlled by several parameters, defined as shown in the following Table 1:

TABLE 1

| | |
|---|---|
| Profile depth | The maximum number of characters to be examined in detecting the language. |
| Minimum region | The minimum amount of text to be analyzed at one time. |
| Scan window size | The amount of text to examine when checking a region for sub-regions. |
| Ambiguity threshold | A parameter that determines if the single-language detector can distinguish the language of a buffer from other possible matching languages. |
| Validity threshold | A parameter that determines if the single-language detector considers that any language matches the text in the buffer. |

In operation, as shown in FIG. 3, the overall method proceeds as follows (wherein the reference numeral in parentheses refer to the corresponding reference numerals in FIG. 3):

(300) Receive input (e.g., a buffer of text).

(301) Divide the text into word boundaries using the algorithm of UAX#29 or a similar algorithm.

(302) Find the script boundaries of the text using the "script boundary algorithm" described below and depicted in FIG. 5.

(303) Determine the location of sentence-like boundaries, using the method from UAX#29 or any similar method.

(304) Compare the profile depth to the total size of the buffer. If the profile depth is as large as the entire buffer, invoke the single-language detector on the buffer. If it yields an unambiguous result, record that as the "predominant language" of the document.

(305) Set a "current start" index to 0.

(306) Set a "current end" index to the first sentence boundary.

(307) Define the current length to be "current end"–"current start".

(308) Compare the current length to the minimum region size. If it is smaller, advance the current end, and if the current end is not at the end of the input document, advance the current end to the next sentence boundary and return to (305).

(309) Apply the single-language detector to the region delineated by the current start and end.

(310) If the region size is greater than the scan window size, execute the "window algorithm" set forth below and depicted in FIG. 4.

(311) If the current end is the end of the buffer, stop.

(312) Move the current start to the current end, move the current end to the next sentence boundary, and continue with (307).

Window Algorithm:

In another aspect of the invention, as shown in the flowchart of FIG. 4, an example of the window algorithm invoked at point (310) of the method of FIG. 3 comprises:

(401) setting a current start index to zero, (402) setting a current end index to the current start index plus scan window size, (403) comparing the current end index to the script boundaries, (403a) if there is a script boundary near the current end index, adjusting the current end index to the script boundary, (404) comparing the current end index to the word boundaries, (404a) if the current end index falls within a word, and the end of the word is no more than one-half the scan window size from the current end index, then moving the current end index out to the end of the word, (405) applying the single-language detector to the current region, (405a) transmitting as a hint to the detector the detected language of the current region, (406) if execution of the single-language detector yields an unambiguous result for detected language, then recording the detected language result as a window result for the detected language, (407) if the current end index is the end of the region, terminating execution, or (408) if the current end index is not the end of the region, moving the current start index to the current end index and returning to (402) the setting of the current end index to the current start index plus scan window size.

Script Boundary Algorithm:

In a further aspect of the invention, as shown in the flowchart of FIG. 5, an example of the script boundary algorithm invoked at point (302) of the method of FIG. 3 comprises:

(500a) defining a "letter-like" character to be a character that satisfies any of the Unicode properties of "uppercase letter", "lower-case letter", "title-case letter", "modifier letter" or "other letter", (500b) defining a "normalized script" of a character to be the Unicode script property of that letter (with the exception that Hiragana and Katakana are mapped to CJK), (501) scanning text characters in the buffer, testing each to determine whether it is "letter-like", and stopping at the first letter-like character, or, if no characters are letter-like, terminating execution with a null result, (502a) recording the normalized script of the first detected letter-like character as the current script, (502b) recording the index of the first detected letter-like character as the current region start index, (503) scanning in a forward direction, testing each character, (504) if a character under test is not letter-like, continuing the scan, (505) if a character under test is letter-like, checking its normalized script, and if its normalized script matches the current script, then continuing the scan, (506) if the scan reaches the end of the buffer, recording a 3-tuple of current start index, end-of-buffer index and current script as a script region, and terminating execution, or (507) if the character is letter-like but its normalized script does not match the current script, then (a) recording a 3-tuple of current start index, current index and current script as a script region, (b) resetting the current start index to the current index, and (c) resetting the current script to the script of the character under test, then (d) continuing the scan.

Figure 6:
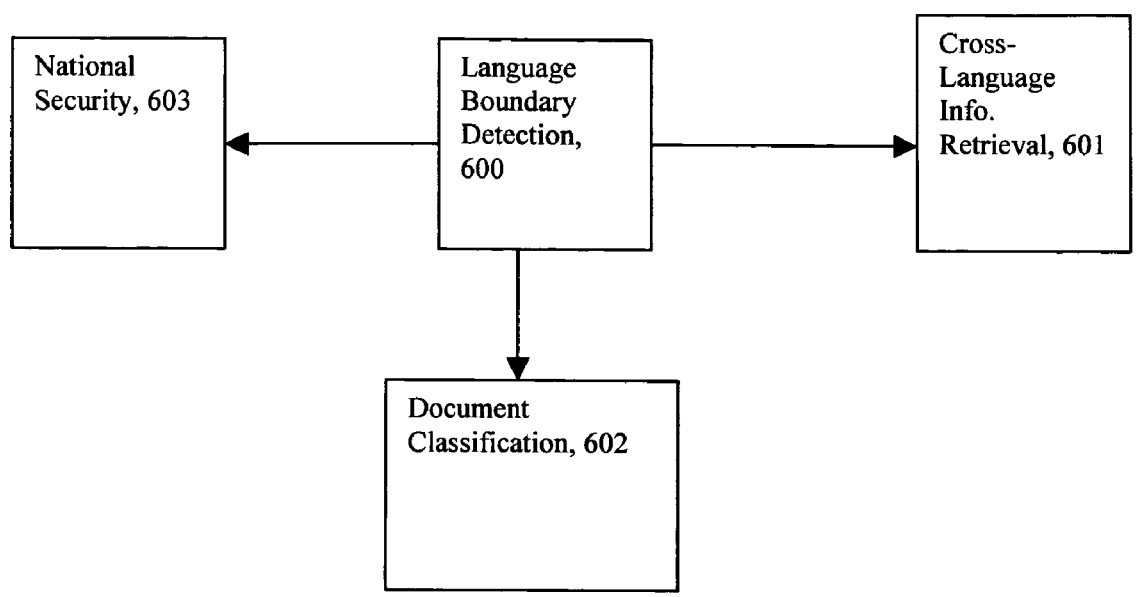
FIG. 6 is a schematic block diagram of a system including language boundary detection, cross-language information retrieval, document classification, and national security components.

Exemplary Applications:

Those skilled in the art will appreciate that numerous applications can be made of the present invention, as shown at (313) of FIG. 3, and in the exemplary system schematically depicted in FIG. 6, including modules for boundary detection (600) in accordance with the above description, cross-language retrieval (601), document classification (602) and national security analysis (603), as follows:

Cross-Language Retrieval (601): For example, a cross-language information retrieval system can be implemented, in which different linguistic analysis is performed on each region of a document or body of text, based on the detected language. Using the language boundary detection of the present invention, in combination with various known techniques of linguistic analysis, including those offered by Basis Technology Corp. of Cambridge, Mass., different analysis can be provided for, e.g., Japanese vs. Arabic, with the result that speed and accuracy of translation or other analysis can be optimized for each section. (See, e.g., commonly-owned U.S. patent application Ser. No. 10/778,676 filed Feb. 13, 2004, entitled Non-Latin Language Analysis, Name Matching, Transliteration, Transcription and Phonetic Search, incorporated herein by reference.)

Document Classification (602): Using the language boundary detection of the present invention, in combination with various known techniques, document classification can be performed, based on the language population of a document or body of text, i.e., which languages are detected in the document, and the relative quantities of text in each of the languages.

National Security (603): The invention can also be used in identifying documents having high national security priority, by detecting the presence of text in a particular language concealed in the midst of a different text or body of information. This can be useful in a wide range of settings in which terrorists or others may attempt to conceal and covertly transmit information for nefarious purposes, using steganographic or other concealment techniques.

CONCLUSION

The above-described methods, structures and systems thus enable the detection or identification of boundaries between areas of different languages in a body of text or other input.

Those skilled in the art will appreciate that the foregoing descriptions of methods, structures and systems in accordance with the invention are provided solely by way of example, and that numerous modifications and variations are possible and within the spirit and scope of the invention, which are limited solely by the claims set forth below.

I claim:

1. A method of detecting boundaries between languages in a body of text containing at least two languages, the method comprising:

receiving a buffer containing text, determining the location of word-like boundaries in the text by executing an algorithm for determining boundaries between logical units in text, determining script boundaries in the text by executing a script boundary algorithm, determining the location of sentence-like boundaries by executing an algorithm for determining boundaries between logical units in text, comparing a defined profile depth to the total size of the buffer, the profile depth being a maximum number of characters to be examined in detecting the language, if the profile depth is substantially the same size as the entire buffer, executing a single-language detector on the buffer, if execution of the single-language detector yields an unambiguous result for a detected language, then recording the detected language as the predominant language of the text, setting a current start index to zero, setting a current end index to a first determined sentence boundary, defining a current length to be current end index minus current start index, comparing the current length to a defined minimum region size, the minimum region size being defined as a minimum amount of text to be analyzed at one time, if the current length is smaller than the minimum region size, then advancing the current end index, and if the current end index is not at the end of the buffer, advancing the current end index to the next sentence boundary and returning to the setting of a current start index, applying the single-language detector to the region of text defined by the current start index and current end index, if the region size is greater than a defined scan window size, the scan window size being defined as an amount of text to examine when checking a region for sub-regions, then invoking a window algorithm to check for sub-regions, if the current end index is at the end of the buffer, stopping execution, or, if the current end index is not at the end of the buffer, then moving the current start index to the current end index, moving the current end index to the next sentence boundary, and returning to the step of defining a current length.

2. The method of claim 1 wherein the window algorithm comprises:

setting a current start index to zero, setting a current end index to the current start index plus scan window size, comparing the current end index to the script boundaries, if there is a script boundary near the current end index, adjusting the current end index to the script boundary, comparing the current end index to the word boundaries, if the current end index falls within a word, and the end of the word is no more than one-half the scan window size from the current end index, then moving the current end index out to the end of the word, applying the single-language detector to the current region of text, transmitting as a hint to the detector the detected language of the current region of text, if execution of the single-language detector yields an unambiguous result for detected language, then recording the detected language result as a window result for the detected language, if the current end index is the end of the region, terminating execution, if the current end index is not the end of the region, moving the current start index to the current end index and returning to the setting of the current end index to the current start index plus scan window size.

3. The method of claim 2 wherein the script boundary algorithm comprises:

defining a letter-like character to be a character that satisfies any of the Unicode properties of upper-case letter, lower-case letter, title-case letter, modifier letter or other letter, defining a normalized script of a character to be the Unicode script property of that letter, scanning text characters in the buffer, testing each to determine whether it is letter-like, and stopping at the first letter-like character, or, if no characters are letter-like, terminating execution with a null result, recording the normalized script of the first detected letter-like character as the current script, recording the index of the first detected letter-like character as the current region start index, scanning in a forward direction, testing each character, if a character under test is not letter-like, continuing the scan, if a character under test is letter-like, checking its normalized script, and if its normalized script matches the current script, then continuing the scan, if the scan reaches the end of the buffer, recording a 3-tuple of current start index, end-of-buffer index and current script as a script region, and terminating execution, or if the character is letter-like but its normalized script does not match the current script, then recording a 3-tuple of current start index, current index and current script as a script region, resetting the current start index to the current index, and resetting the current script to the script of the character under test, then continuing the scan.

4. The method of claim 3 wherein the defining of a normalized script of a character comprises the exception that Hiragana and Katakana are mapped to CJK.

5. The method of claim 3 further comprising:

executing cross-language information retrieval by performing different linguistic analysis on each region of the text based on the detected language of each region.

6. The method of claim 3 further comprising:

executing document classification based on the language population, including which languages are detected, and the relative quantities of text in each language.

7. The method of claim 3 further comprising:

detecting the presence of text in a particular language within text or other information of another language.

8. A system for detecting boundaries between languages in a body of text containing at least two languages, the system comprising:

word boundary detection means operable to detect, in a buffer of received text, word boundaries in the text by executing an algorithm for determining boundaries between logical units in text, script boundary detection means operable to detect script boundaries in the text by executing a script boundary algorithm, sentence boundary detection means operable to determine the location of sentence-like boundaries by executing an algorithm for determining boundaries between logical units in text, comparison means operable to compare a defined profile depth to the total size of the buffer, the profile depth being a maximum number of characters to be examined in detecting the language, and if the profile depth is substantially the same size as the entire buffer, executing a single-language detector on the buffer, and if execution of the single-language detector yields an unambiguous result for a detected language, then recording the detected language as the predominant language of the text, means for setting a current start index to zero, for setting a current end index to a first determined sentence boundary, and for defining a current length to be current end index minus current start index, means for comparing the current length to a defined minimum region size, the minimum region size being defined as a minimum amount of text to be analyzed at one time, and if the current length is smaller than the minimum region size, then advancing the current end index, and if the current end index is not at the end of the buffer, advancing the current end index to the next sentence boundary and returning to the setting of a current start index, and means for applying the single-language detector to the region of text defined by the current start index and current end index, wherein:

if the region size is greater than a defined scan window size, the scan window size being defined as an amount of text to examine when checking a region for sub-regions, then invoking a window module to check for sub-regions, if the current end index is at the end of the buffer, stopping execution, or, if the current end index is not at the end of the buffer, then moving the current start index to the current end index, moving the current end index to the next sentence boundary, and returning to the step of defining a current length.

9. The system of claim 8 wherein the window module comprises:

means for setting a current start index to zero, and for setting a current end index to the current start index plus scan window size, means for comparing the current end index to the script boundaries, and if there is a script boundary near the current end index, adjusting the current end index to the script boundary, means for comparing the current end index to the word boundaries, and if the current end index falls within a word, and the end of the word is no more than one-half the scan window size from the current end index, then moving the current end index out to the end of the word, means for applying the single-language detector to the current region of text, and transmitting as a hint to the detector the detected language of the current region of text, and if execution of the single-language detector yields an unambiguous result for detected language, then recording the detected language result as a window result for the detected language, wherein:

if the current end index is the end of the region, terminating execution, if the current end index is not the end of the region, moving the current start index to the current end index and returning to the setting of the current end index to the current start index plus scan window size.

10. The system of claim 9 wherein the script boundary module comprises:

means for defining a letter-like character to be a character that satisfies any of the Unicode properties of upper-case letter, lower-case letter, title-case letter, modifier letter or other letter, means for defining a normalized script of a character to be the Unicode script property of that letter, means for scanning text characters in the buffer, testing each to determine whether it is letter-like, and stopping at the first letter-like character, or, if no characters are letter-like, terminating execution with a null result, means for recording the normalized script of the first detected letter-like character as the current script, means for recording the index of the first detected letter-like character as the current region start index, means for scanning in a forward direction, testing each character, and if a character under test is not letter-like, continuing the scan, or if a character under test is letter-like, checking its normalized script, and if its normalized script matches the current script, then continuing the scan, means for, if the scan reaches the end of the buffer, recording a 3-tuple of current start index, end-of-buffer index and current script as a script region, and terminating execution, or if the character is letter-like but its normalized script does not match the current script, then recording a 3-tuple of current start index, current index and current script as a script region, resetting the current start index to the current index, and resetting the current script to the script of the character under test, then continuing the scan.

11. The system of claim 10 wherein the defining of a normalized script of a character comprises the exception that Hiragana and Katakana are mapped to CJK.

12. The system of claim 10 further comprising:

means for executing cross-language information retrieval by performing different linguistic analysis on each region of the text based on the detected language of each region.

13. The system of claim 10 further comprising:

means for executing document classification based on the language population, including which languages are detected, and the relative quantities of text in each language.

14. The system of claim 10 further comprising:

means for detecting the presence of text in a particular language within text or other information of another language.

* * * * *